United States Patent [19]

Loesch

[11] Patent Number: 4,733,325

[45] Date of Patent: Mar. 22, 1988

[54] ELECTRICAL PROTECTIVE DEVICES

[75] Inventor: Robert P. Loesch, Omaha, Nebr.

[73] Assignee: American Telephone and Telegraph Company AT&T Technologies, Inc., Berkeley Heights, N.J.

[21] Appl. No.: 910,549

[22] Filed: Sep. 23, 1986

[51] Int. Cl.⁴ ............................................ H02H 9/06

[52] U.S. Cl. .................................. 361/119; 361/120; 361/124; 337/32

[58] Field of Search ............... 361/119, 120, 124, 129; 337/31-34, 18, 28

[56] References Cited

U.S. PATENT DOCUMENTS

| | | | |
|---|---|---|---|
| Re. 30,724 | 8/1981 | Klayum et al. | 361/124 |
| 4,013,927 | 3/1977 | Gilberts | 361/119 |
| 4,091,435 | 5/1978 | Ahuja | 361/119 |
| 4,320,435 | 3/1982 | Jones | 361/119 |
| 4,366,412 | 12/1982 | Lange et al. | 361/120 |
| 4,405,967 | 9/1983 | Cwirzen | 361/124 |
| 4,434,449 | 2/1984 | Dickey | 361/119 X |
| 4,458,288 | 7/1984 | Chapman, Jr. et al. | 361/119 X |
| 4,502,087 | 2/1985 | Huvet | 361/119 |

*Primary Examiner*—A. D. Pellinen
*Assistant Examiner*—Todd E. DeBoer
*Attorney, Agent, or Firm*—Edward Somers

[57] ABSTRACT

A protector module (30) for protecting tip and ring conductors of a telephone loop includes a pair of protector assemblies (40—40′) which are supported within a common housing (32). A voltage protection subassembly (42) of each protector assembly is connected electrically to a grounding subassembly (44) for causing current associated with excessive voltage surges to be conducted to ground. Each protector assembly also includes a current protection subassembly (41) which comprises a dielectric base, as well as a tubular line pin (61) and a central office pin (57) which are connected together electrically. A shunting element (62) is disposed concentrially about and is supported at one end of the line pin in an initial position by a pellet (70) of a fusible material which extends between a closed end of the shunting element and an edge surface (68) of an open end of the line pin. A spring (43) between a cup (93) of the voltage protection subassembly and the housing maintains the voltage protection subassembly in engagement with the shunting element and the pellet of fusible material in engagement with the line pin. When current flow exceeds a predetermined level that is sufficient to melt the pellet of fusible material or during a prolonged voltage surge, the spring is effective to cause the shunting element to be moved to a position where a flange (67) thereof engages a plate (86) of the grounding subassembly to establish a fault current path to ground.

21 Claims, 10 Drawing Figures

ELECTRICAL PROTECTIVE DEVICES

TECHNICAL FIELD

This invention relates to electrical protective devices. More particularly, it relates to devices for protecting communications circuits against excessive voltage surges and excessive currents.

BACKGROUND OF THE INVENTION

In telephone engineering, it is usual practice to provide protectors at central offices for each incoming line. These protectors, which may be termed modules, combine protection against excessive voltages resulting from lightning, for example, with protection against sneak currents. Sneak currents are not strong enough to do any damage if they flow briefly, but may generate enough heat to char conductor insulation and do other damage if allowed to persist. The sneak currents are produced by voltages of relatively low magnitude as compared to the excessive voltages mentioned hereinabove and usually result from accidental interference between telephone lines and adjacent power lines.

Protection of a telephone line against excessive voltage is usually provided by a so-called spark-gap protector which generally includes a pair of spaced carbon electrodes or a gaseous discharge device. One of the electrodes is usually connected to ground and the other to the incoming telephone line. Should a high voltage be impressed on the line, it will bridge the gap between the electrodes and cause current to flow to ground, thus bypassing sensitive equipment which is associated with the line.

The second type of protection is commonly provided by a device that is referred to as a heat coil. The heat coil includes high resistance wire which is wound on a metal sleeve inside of which a contact pin is held in a predetermined position by a fusible bonding material such as solder, for example. Should excessive currents occur on the line and persist, sufficient heat will be generated by the wire to melt the solder and release the pin. A spring is usually provided which urges the released pin into electrical contact with a source of ground potential to ground the line and protect sensitive line equipment.

Inasmuch as a ring conductor and a tip conductor are associated with each telephone station apparatus, each telephone line requires two protector assemblies. A telephone circuit protector module shown in J. B. Geyer et al U.S. Pat. No. 3,573,695 which issued on Apr. 6, 1971, includes two protector assemblies enclosed in a single insulative housing. Spark-gap and heat coil subassemblies therein are held in abutting aligned relation by a single spring which is part of the normal transmission circuit. The spring also serves to propel a pin of the heat coil subassembly into engagement with a grounding circuit, which includes one of two carbon blocks, during the passage of excessive currents through the heat coil. In Geyer et al, the axis of each heat coil pin is aligned axially with the axis of its associated carbon blocks. To complete a fault current path to ground, the pin in the heat coil subassembly must be brought into contact with a carbon block in the spark-gap protector subassembly. This causes excessive heating of the spark-gap subassembly, which becomes part of the fault path, because of the relatively high resistance of the carbon blocks. The extension of a contact pin through voltage protection portions of the protector has precluded the use of gaseous discharge devices in place of carbon blocks. Gaseous discharge devices, which are commonly referred to as gas tubes, are desirable because of their longer lives and because they afford better control of the breakdown voltage.

In a protector module shown in U.S. Pat. No. 4,215,381 which issued on July 29, 1980, to R. F. Heisinger, gaseous discharge devices may be used inasmuch as the voltage protection portion of the protector is taken out of the fault circuit. When sufficient heat is transferred to the heat coil subassembly such as by a current fault, a fusible alloy melts to allow a spring to cause a heat coil flange to move and touch a laterally projecting tab of a ground terminal assembly. If a prolonged voltage surge occurs, there is an arcing over in the voltage surge limiter assembly, heat energy is transferred to a pin of the heat coil which engages a portion of the voltage surge limiter assembly, the fusible alloy is melted, and the spring moves the heat coil flange plate as before. However, the Heisinger protector module continues the use of a spring as part of the normal transmission and fault current circuits. At times, the presence of the spring in the voice frequency circuit may result in noise on the line. Also, because the spring moves slidably, insulating sleeves are disposed about the spring to prevent shorting.

A protector module in which a spring is not in the transmission circuit is disclosed in U.S. Pat. No. 4,168,515. When an excessive current increase occurs, a fusible alloy is melted to allow a bobbin on a pin of a heat coil assembly to be moved by the spring. This allows a cup, which is supported indirectly by the bobbin, to be moved by the spring to engage a plate to which the heat coil, line and central office pins are staked. As a result, a fault current path is established from the line pin through the cup to a ground plate.

The aforementioned prior art protector assemblies each include a seemingly excessive number of elements. A protector assembly having substantially fewer elements and adapted to include either gas tubes or carbon blocks is disclosed in U.S. Pat. No. 4,458,288 which issued on July 3, 1984 in the names of J. L. Chapman, Jr. et al. Each of two protector assemblies supported in a common housing includes a current protection subassembly which comprises a dielectric base and a line pin and a central office pin connected together electrically. A shunting element is disposed concentrically about the line pin and is secured to one end of the line pin in an initial position by a fusible material. A spring between a cup of each voltage protection subassembly and the housing maintains the voltage protection subassembly in engagement with the shunting element. The spring is effective when current flow exceeds a predetermined level that is sufficient to melt the fusible material to cause the shunting element to be moved to a position where it engages a portion of a grounding subassembly to establish a fault current path to ground. For a prolonged voltage surge, heat energy is transferred from the voltage protection subassembly to the shunting element and melts the fusible material to allow the shunting element to be moved as in a current overload mode.

In the above-described protector, the heat coil includes a sleeve which is bonded to one end of a cylindrically shaped pin by solder. After soldering, but before the winding of turns of a wire about the sleeve, the assembly is heat-treated to recrystallize the solder which had been annealed. Then the assembly is stored and creep tests of samples taken. As can be surmised, the heat treating requires additional time and increases inventory. What is needed and what seemingly is not provided in the prior art is a protector in which bonding of elements which are to function in an overload mode is not required.

SUMMARY OF THE INVENTION

The foregoing problems have been overcome by the protector assembly of this invention. The protector assembly includes a dielectric housing for supporting the protector assembly and a grounding subassembly that is adapted to connect the assembly to ground when excessive voltage surges and excessive current increases appear in the circuit. A voltage protection subassembly is connected electrically to the grounding subassembly for conducting current associated with excessive voltage surges to ground. The protector assembly also includes a current protection subassembly having a dielectric base, first and second electrically conductive elements mounted in said base and a shunting element which are connected together to establish electrical contact between the circuit and the protector assembly. The shunting element is aligned axially with the first element and supported in spaced relationship thereto by a pellet of a fusible material interposed between an end of the first element and a portion of the shunting element. A compression spring is interposed between the voltage protection subassembly and the housing for maintaining the voltage protection subassembly in engagement with the shunting element. When the current flow increases above a predetermined level, the pellet of fusible material melts and the spring becomes effective to cause the shunting element to be moved along the first conductive element to cause a portion of the shunting element to engage the grounding subassembly and provide a current path from the first conductive element to ground. In the preferred embodiment, the conductive elements are formed pins.

In a preferred embodiment, the shunting element includes a heat coil which is disposed concentrically about a first conductive pin, called a line pin, and supported in a first position therealong by the pellet of fusible material. The heat coil includes a sleeve having convolutions of a wire wrapped about a portion of the length of the first conductive pin with one end of the wire bonded to one end of the sleeve which engages the voltage protection subassembly. The other end of the wire is bonded to a second conductive pin. When current flow above the predetermined level occurs, sufficient heat is transferred to the sleeve to melt the pellet of the fusible material. This permits the spring to cause the sleeve to be moved to a second position which allows a projecting flange of the sleeve to engage the grounding subassembly to establish a fault current path and shunt the current to ground. Advantageously, the pellet of fusible material engages not only an end of the line pin, but also engages a closed end of the sleeve which is engaged by a portion of the voltage protection subassembly. Any build-up of heat is transferred efficiently into the fusible material rather than through a relatively long distance to a fusible bonding material as in some prior art devices.

Another feature of the protector of this invention resides in the configuration of the sleeve. In the hereinbefore-identified J. L. Chapman et al patent, the sleeve was cylindrical, but it was soldered to the line pin thereby allowing a wire to be wrapped thereabout without any turning of the sleeve on the line pin. Herein, inasmuch as the sleeve is not attached to the line pin, the sleeve is configured to have a square cross-section opening therethrough and the end of the pin disposed in the opening also has a square cross-section. Notwithstanding the absence of bonding between the sleeve and the line pin, the sleeve cannot turn on the line pin during winding of the wire on the sleeve.

In the protector assembly of this invention, the axis of each current responsive means of each current protection subassembly is aligned with a line pin but the line pin is offset from the axis of the voltage protection subassembly. The spring which is disposed within the same housing as the heat coil subassembly and the voltage protector subassembly is removed from the current flow paths. Also, the current responsive means and the line pin are combined into one subassembly. This eliminates the need for a separate line terminal assembly which is customary in some prior art protector modules.

BRIEF DESCRIPTION OF THE DRAWINGS

Other features of the present invention will be more readily understood from the following detailed description of specific embodiments thereof when read in conjunction with accompanying drawings, in which.

DETAILED DESCRIPTION

Figures 1, 2:
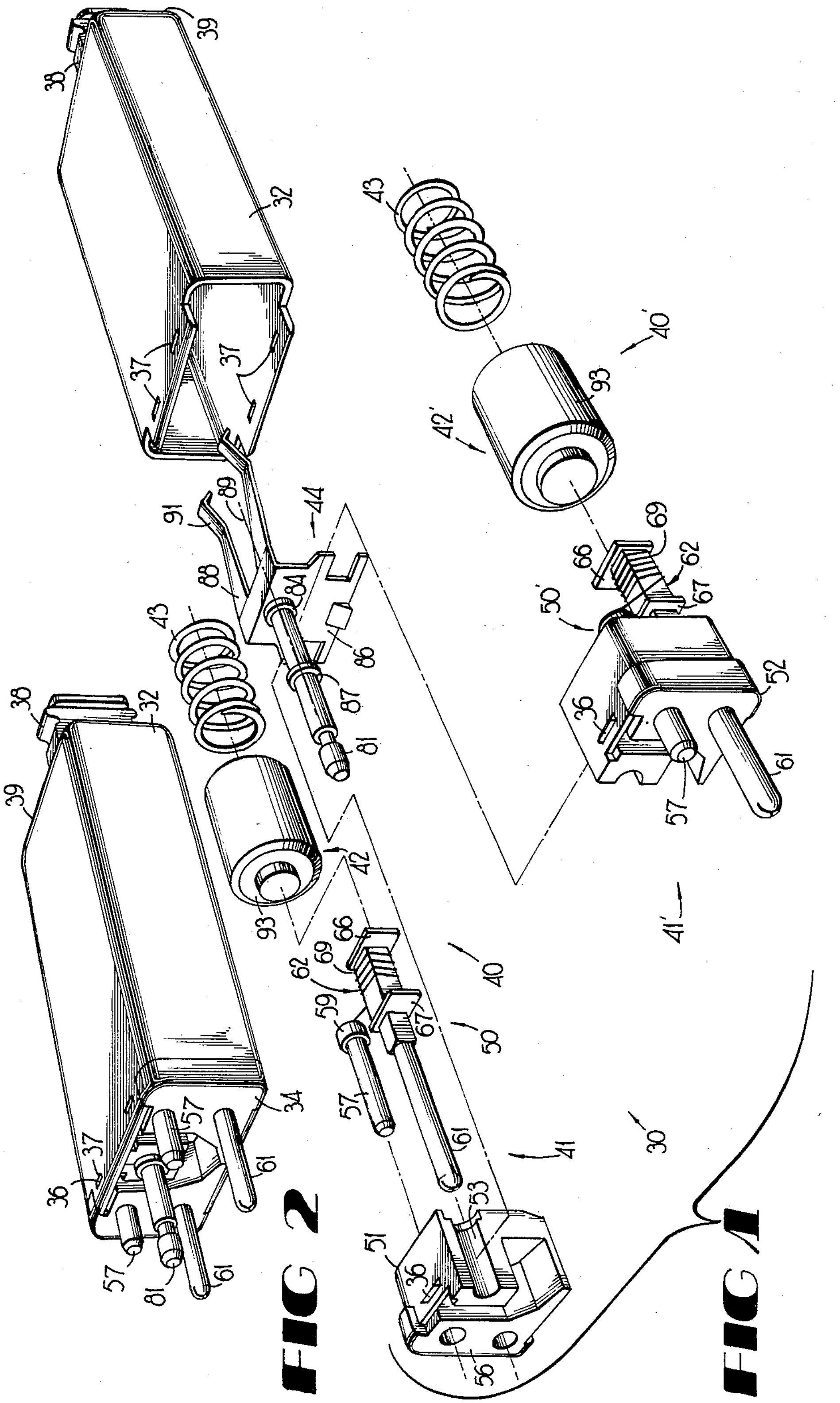
FIG. 1 is an exploded perspective view of a protector module which includes a pair of the electrical protector assemblies of this invention.
FIG. 2 is a perspective view of an assembled protector module of this invention.

Referring now to FIG. 1 there is shown a protector module which is designated generally by the numeral 30. A plurality of the protector modules may be mounted in a panel (not shown herein but see FIG. 1 of hereinbefore-identified J. L. Chapman et al U.S. Pat. No. 4,458,288 which is incorporated by reference hereinto) which has a plurality of sockets therein for receiving a plurality of pins projecting from the array of circuit protector modules. A plastic housing 32 is shown with a base subassembly 34 which is snap-fastened thereto by tangs 36—36 (see FIG. 2) on the base which are received in slots 37—37 in the housing. As can be seen in the drawings, a finger grip 38 is provided adjacent to a closed end 39 of the housing.

Figure 4:
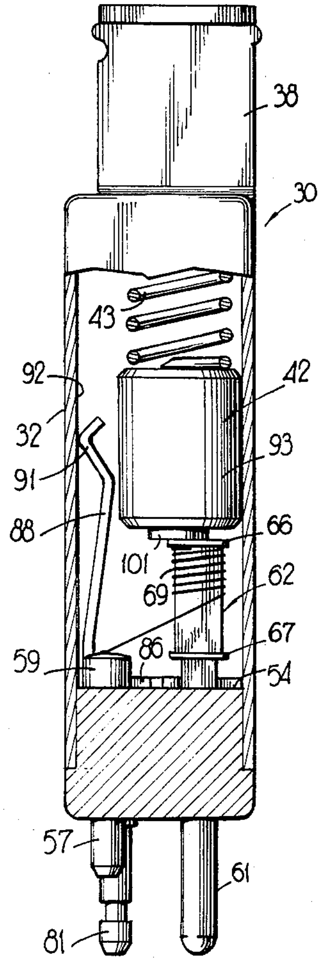
FIG. 4 is a side elevational view of the module of FIG. 2 partially in section.
Figure 3:
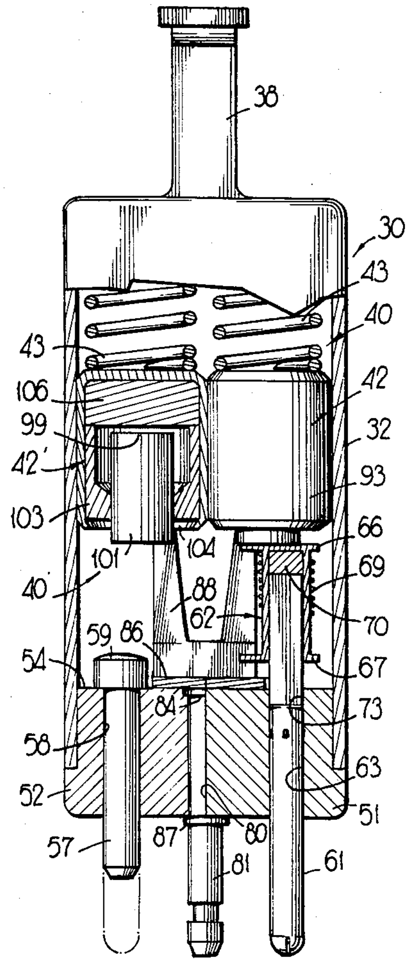
FIG. 3 is a front elevational view partially in section of the module of FIG. 2.

As can be seen in FIGS. 1 and 3–4, a pair of protector assemblies, designated generally by the numerals 40 and 40', are enclosed in the housing 32. One of the protector assemblies provides protection for a ring conductor and the other provides protection for a tip conductor of an associated telephone circuit (not shown). Except for base portions of each, the protector assemblies 40 and 40' are structurally identical to each other. Therefore, except for the base portions of each, the same numerals will be used for corresponding parts of the two protector assemblies with the general designation of subassemblies for one having a primed superscript.

Referring particularly to FIG. 1, it can be seen that the protector assembly 40 includes a current overload or protection subassembly which is designated generally by the numeral 41, a voltage protection subassembly which is designated generally by the numeral 42 and a compression spring 43. The voltage protection subassembly 42 is sometimes referred to as a voltage surge limiter subassembly. The protector module 30 also includes a grounding subassembly which is designated generally by the numeral 44 and which is common to both assemblies 40 and 40'.

Figure 5:
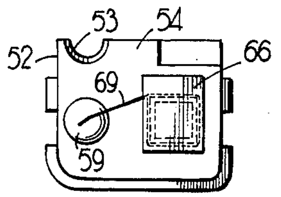
FIG. 5 is a plan view of a portion of the base of a heat coil subassembly.

The current protection subassembly 41 of the protector assembly 40 includes a current responsive portion 50 (see FIG. 1) which is generally referred to as a heat coil subassembly. The heat coil subassembly 50 is mounted in a right-hand base portion 51, as viewed in FIG. 3, and the heat coil subassembly 50' is mounted in a left-hand base portion 52. The left-hand and right-hand portions 51 and 52 which together comprise the base 34, are mirror images of each other and, in a preferred embodiment, each is made of a plastic insulating material such as polybutylene terephthalate (PBT). Each base half 51 and 52 (see FIGS. 1 and 5) also includes a semi-cylindrical passageway 53 formed from a surface 54 to a lower surface 56 thereof. This passageway 53 in one base half is designed to cooperate with the passageway in the other base half when the two are mated together to form the base subassembly 34.

Each portion of the base subassembly 34 supports first and second electrical contact elements which form part of the normal circuit current path. One of these is a central office pin 57 (see FIGS. 1 and 3-4) which is mounted in an interference fit in a bore in each one of the base portions. A headed portion 59 (see also FIG. 5) of each central office pin 57 extends above the surface 54 of each base half.

Figure 6:
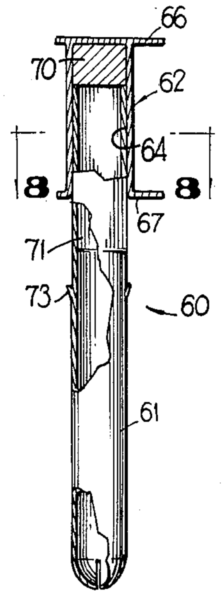
FIG. 6 is an elevational view of a pin-eyelet assembly which comprises a portion of the heat coil subassembly of FIG. 5.
Figure 7:
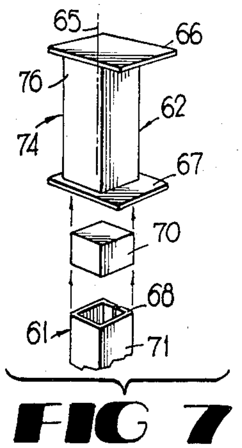
FIG. 7 is a perspective view which shows an end portion of a line pin, a pellet of fusible material and a sleeve of the protector module of this invention.

Each heat coil subassembly includes a pin-eyelet subassembly 60 (see FIGS. 1 and 6). The input to each protector assembly 40—40 of the protector module 30 is through the pin-eyelet subassembly 60. The pin-eyelet subassembly 60 includes a line pin 61 which is received in an interference fit in a bore 63 in the base half 51 (see FIG. 3). The line pin 61 in a preferred embodiment is tubular, having been formed from flat stock. Also an upper end of the pin 61 as seen in FIG. 7 is open and includes an edge surface 68. Also, the transverse cross-section of an end portion 71 of the pin 61 which is adjacent to the voltage protection subassembly 42 is rectangular, and in the preferred embodiment is square. This portion 71 transitions into another portion which is circular in cross section (see FIG. 1).

Figure 8:
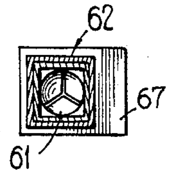
FIG. 8 is cross-sectional view of a portion of the pin-eyelet assembly of FIG. 6 taken along lines 8—8 thereof.

The pin-eyelet subassembly 60 also includes an eyelet 62 having a longitudinal axis 65 (see FIG. 7). As can be seen in FIGS. 7 and 8, the cross-section of the eyelet in a plane normal to its longitudinal axis 65 is rectangular and in a preferred embodiment is square to conform to that of the line pin 61. Also, the eyelet 62 has the configuration of a sleeve or spool and includes a central passageway 64 (see FIG. 6) and two flanges 66 and 67. The pin-eyelet assembly 60 is mounted in an interference fit in the bore 63 of the heat coil base 51 (see FIGS. 3 and 5) such that the lower flange 67 of each eyelet 62 is spaced above the top surface of the base. The end of the eyelet which is adjacent to the voltage protection subassembly is closed by the flange 66. Also, as can be seen in FIGS. 1 and 6-7, each flange 66 and 67 has a lengthened portion which extends toward the longitudinal centerline of the protector module. The flange 66 prevents any jamming of the heat coil subassembly 50 between the voltage protection subassembly 42 and the housing 32.

A pellet 70 of fusible material, such as low temperature solder, for example, is held in compressive engagement between the closed end of the eyelet 62 and the end surface 68 of the pin 61 (see FIG. 7) by the compression spring 43. The eyelet 62 hence is supported in a first position at one end of the line pin 61 by means of the pellet 70 (see FIGS. 3 and 6), which has a predetermined melting point.

The line pin 61 of the pin-eyelet subassembly or shunting element 60 also includes barbs 73—73 which are spaced between the lower end of the line pin and the lower flange 67 of the eyelet. The barbs 73—73 of each line pin 61 are received within the base in order to cause the line pin to be able to resist forces which may be applied axially thereof.

Advantageously, the barbs 73—73 about the line pin 61 causes an interference fit between the plastic of the base half 51 and the pin which is able to resist the force of about five pounds. Such a force may be generated by plugging a protector module 30 into a central office panel.

The eyelet 62 is designed to hold a plurality of convolutions of a resistance wire 69 (see FIGS. 3-4) of the heat coil subassembly thereon. The wire 69 which is wound about the hub of the eyelet 62 is made from an alloy such as nichrome which in a preferred embodiment is covered with nylon insulation having a wall thickness of 0.008 cm. In the preferred embodiment, the wire 69 is such that its resistance between the line pin 61 and the central office pin 57 is not greater than 4 ohms. One end of the wire 69 is welded to a hub 74 of the eyelet adjacent to an end 76 and an unwound trailing end is welded to the head 59 of the central office pin 57 (see FIG. 4). The eyelet 62 is made of a metallic material since it is part of the loop circuit. The wire 69 is insulated since it is wound on the metallic hub 74 of the eyelet with its convolutions generally touching one another. Also, in the preferred embodiment, the convolutions of the wire 69 are concentrated along that portion of the sleeve which is adjacent to the pellet 70 (see FIG. 1).

Because the end portion of the line pin 61 is square to conform to the configuration of the sleeve 62, rotation of the sleeve on the line pin during winding of the wire 69 is inhibited. The line pin cannot rotate inasmuch as a portion of its length which has a square cross-section is received in a recess 73 in the base 51 or 52 which has a square matching cross-section.

A normal circuit path for the current is from the line pin 61 through the sleeve 62, through the wire 69 of the protector assembly 40 and out through the central office pin 57. When there is a current overload, the circuit through the line pin 61 into the metal eyelet 62 and through the wire 69 to the central office pin 57 causes the temperature of the wire to increase. The increased temperature is sufficient to cause the pellet 70 of the fusible alloy to melt and permit relative movement between the eyelet and the line pin. Inasmuch as the convolutions of the wire 69 are concentrated about the sleeve in the vicinity of the pellet 70, high current through the wire causes a rapid melting of the pellet 70 of fusible material. Also, because the end of the tubular line pin which is disposed within the sleeve 62 is open ended (see FIG. 7) with the pellet 70 being supported on the edge surface 68 thereof, the melted solder is allowed to flow into the pin to allow the sleeve to be moved along the pin by the associated compression spring 43.

It should be understood that while an eyelet is used in the preferred embodiment, other equivalents could be used. For example, only the ends of the sleeve or the eyelet need be conductive with one end of the insulated resistance wire 69 being bonded to one end of the sleeve and with the other end bonded to the headed end of the central office pin 57.

Other arrangements within the scope of this invention are also possible for the heat coil assembly. For example, an eyelet having conductive flanges and a thermally conductive hub could be used. Uninsulated wire could be wound on the hub with the convolutions spaced apart with one end of the wire bonded to a flange and the other end welded to the head of the central office pin as before. As the temperature of wire increases, the hub will transmit the heat energy to the pellet of the fusible alloy to melt it and allow operation of the heat coil as before.

Figure 9:
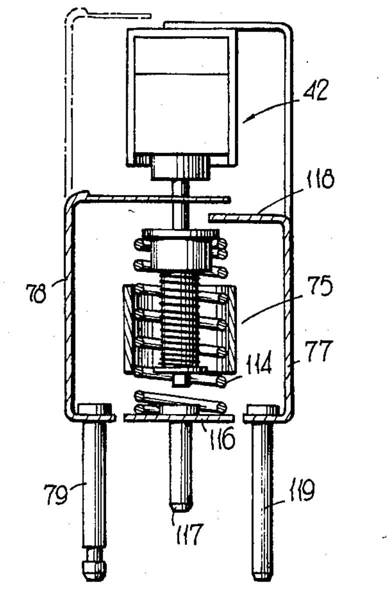
PRIOR ART FIG 9
FIGS. 9 and 10 are schematic views of a prior art protector device and a protector device of this invention, respectively.

Unlike some prior art protector assemblies, the line pin 61 of the protector assembly 40 of this invention for a conductor of each circuit forms a portion of the heat coil portion 50 of the current protection subassembly 41. This can be seen best by comparing FIGS. 9 and 10. In FIG. 9 is depicted a prior art protector module which includes a heat coil portion 75, a line pin subassembly 78, a ground subassembly 77, and the voltage protection subassembly 42. As can be seen in FIG. 9, the heat coil subassembly 75 is aligned with the voltage protection subassembly 42 but is offset from a line pin 79. In the protector assembly shown in FIG. 10, the line pin 61 is aligned with the heat coil but is offset from the voltage protection subassembly 42.

When the base assemblies 51 and 52 are mated together to form the base 34, the semi-cylindrical passageways 53—53 are brought together in order to form a cylindrical passageway 80 (see FIG. 3) for receiving a ground pin 81 of the grounding subassembly 44. The grounding subassembly 44 is shown in FIG. 3 and includes the pin 81 having a shoulder 84 which is riveted to a ground plate 86 which is disposed along the top surface of the mated halves 51 and 52 of the base 34. When so disposed, portions of the ground plate 86 are received between the lower flange 67 of each one of the pin eyelet assemblies 60—60 and the top surface 54 of the base (see FIGS. 3–4). The ground plate 86 of the grounding subassembly 44 is disposed between the central office pin 57 and the line pin 61 of each half of the base. The ground pin 81 of the grounding subassembly also includes a shoulder 87 (see FIG. 1). The shoulder 87 is adjacent to the surface 56 of the base 34 when the pin 81 is disposed within the passageway 80.

The grounding subassembly 44 also includes a bifurcated portion 88 which extends upwardly from the plate 86 and inwardly toward a centerline 89 of the ground pin 81 (see FIGS. 1 and 4). As such, each one of upwardly extending fingers or furcations 91—91 is spaced to one side of the centerline which extends through the ground pin.

The fingers 91—91 are configured to establish electrical contact with the voltage protection subassemblies 42–42′ of the module 30. Referring to FIG. 4, it can be seen that the free ends of the fingers 91—91 are shaped to bear against an inner surface 92 of the housing 32 to insure electrical contact with the voltage overprotection device 42. One finger 91 engages a metallic cup 93 which houses the voltage protection subassembly 42 for the protection assembly 40 and the other finger 91 engages a cup 93 which houses the voltage protection subassembly for the protector assembly 40′.

The voltage protection subassembly 42 of the protector assembly 40 include a surge limiter having a pair of electrodes such as a pair of carbon blocks, for example, (see FIG. 3). It should be understood that although carbon blocks are shown in the drawings for the voltage overprotection devices, gas tubes, which are well known, also could be used. The cup 93 is positioned such that a lower one of the carbon blocks shown in FIG. 3 has its electrode protruding therefrom to engage the upper flange 66 of an associated one of the pin eyelet subassemblies 60—60. The carbon blocks are received in the cup 93 in a manner to space them apart through a predetermined gap 99. The gap 99 is effective during a voltage protection mode of the protector to cause a sufficiently high voltage to bridge the gap and cause current to flow to ground.

More particularly, the voltage protection subassembly 42 comprises the cup 93 which supports a center carbon electrode 101 or insert which is disposed within a porcelain shell 103. The center carbon electrode extends through an opening 104 in the porcelain shell and protrudes therebeyond a distance of 0.18 cm. The other end of the carbon electrode 101 is spaced a distance of 0.008 cm from a plane through the open end of the porcelain shell 103. The carbon electrode 101 is bonded to the walls of the opening in the porcelain shell. Also disposed within the cup 93 and in engagement with a closed end thereof is a carbon block 106 which is called a base electrode. The base electrode 106 engages the annular rim of the porcelain shell 103. This causes the base electrode 106 to be spaced from the center electrode 101 a distance of 0.008 cm. This gap which is thereby established between the center electrode 101 and the base electrode 106 is predetermined in accordance with the level of voltage protection desired.

When a surge of excessive voltage is generated in a telephone line by a lightning strike, for example, the resulting potential appears across the protector module through the ring conductor protected by protector assembly 40, the tip conductor protected by the protector assembly 40′ or both conductors. Assuming that the potential enters through the ring conductor, it bridges the associated gap 99 between the center electrode 101 and the base electrode 106 of the protector assembly 40 and is conducted to a source of ground potential through the cup 93 and the grounding subassembly 44 (see FIG. 10).

Figure 10:
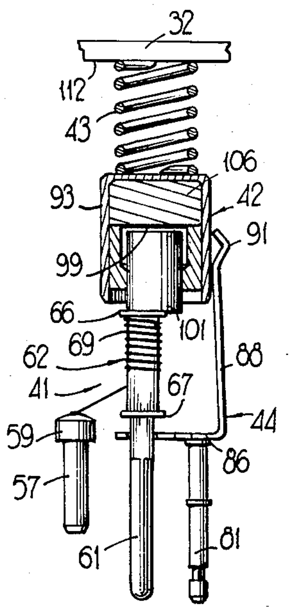

As can be seen in FIGS. 1, 3 and 10 of the drawings, an upper portion of each of the voltage protection subassemblies 42—42 is engaged by a compression spring 43 which also engages an inner portion 112 of the housing 32 of the protector unit. The spring 43 maintains the center electrode 101 in engagement with the eyelet 62. Also, the spring is adapted, upon melting of the pellet 70 of fisible material, to cause the eyelet 62 to be moved from an initial, first position on the line pin 61 where it is supported along the line pin by the pellet to a second position where a flange 67 of the eyelet engages the base plate 86 of the grounding subassembly 44.

Advantageously, the center electrode 101 engages the eyelet 62 adjacent to the pellet 70. In the Chapman, et al. U.S. Pat. No. 4,168,515, the electrode of the voltage protection assembly engages the eyelet, but the fusible material which therein holds the sleeve secured to the line pin is spaced a distance from the electrode. As a result, the heating of the fusible material is not as direct nor as efficient as in the arrangement of this invention.

It is significant that each line pin 61 comprises a portion of associated heat coil subassembly 50 (see FIGS. 1 and 10) and is aligned vertically with the eyelet 62 thereof. The centerline of the line pin 61 and of the heat coil is offset 0.22 cm from the centerline of the voltage protection subassembly 42. This is unlike prior art protector assemblies in which the heat coil assembly is aligned with the centerline of the voltage protection subassembly 42 (see FIG. 9). As a result, the use of a separate line terminal assembly is obviated. The line pin 61 and the eyelet 62 with the resistance wire 69 are made in one assembly thereby reducing the number of component parts for the protector assembly 40.

Another advantage of the protector assembly 40 of this invention is that the spring 43 is removed from both the normal transmission and fault current paths. It provides a force for urging the eyelet 62 into engagement with the ground plate 86 but is not in the normal current path or the fault current circuit. The current flow path for the prior art protector module shown in FIG. 9 is up through the line pin 79 and terminal 78, through a pressure contact with a pin of the heat coil subassembly 75 and the heat coil winding, through a pressure contact with one end of a spring 114, such as in U.S. Pat. No. 4,215,381, through the spring to another pressure contact with a bottom plate 116 and out through a central office pin 117. For a voltage fault, the current flows through the voltage protector 42 and out through the ground terminal 77 and a ground pin 119. In the event of current overload, the fusible alloy which secures the heat coil subassembly 75 along a pin is melted to allow the spring 114 to urge the heat coil flange into engagement with a tab 118 that is connected to the ground pin 119. Because the spring 114 moves, it is necessary to use an insulator to prevent a short circuit. Because the spring 43 in the protector assembly 40 of this invention is not in the normal circuit path, insulating sleeves are not required.

In the operation of the protector module 30 of this invention, the wire 69, which has convolutions wound on the eyelet 62 of the pin eyelet assembly 60, functions as a resistance element with the heat being concentrated therein. In a normal operating mode, current flows in through the line pin 61, through the convolutions of the wire 69 wound on the eyelet 62 and out through the central office pin 57. Advantageously all the connections between these parts which constitute the current path, are connected by welding with no pressure contacts nor soldering of the sleeve to the pin as in prior art protector assemblies.

In the event of excessive current, the current path is as before except that since the current exceeds that of the design load, the unit overheats from the energy generated by the excessive current. The wire 69 generates heat which is transferred to the eyelet 62 and which is sufficient to cause the pellet of fusible alloy material which supports the eyelet along the line pin to melt. At that time, the spring 43 becomes effective to move the eyelet 62 from its first position where it is supported along the pin 61 by the pellet 70 toward the base to a second position where its flange 67 engages the plate 86 of the grounding subassembly (see FIG. 10). The lower flange 67 of the eyelet 62 functions as a shunting element. As a result the current flows through the line pin 61, the eyelet 62 and directly to the ground plate, substantially shortening the current path from that of prior art protector assemblies.

In the event of a voltage overload, the current moves as before through the line pin 61, through the pin eyelet assembly 60 through the center electrode 101 of the voltage protector bridging the gap 99 to the base electrode 106 into the cup 93. There is a spark-over between the center and the base electrodes 101 and 106, respectively, of the voltage protection subassembly. Current is conducted through the spring finger 91 to the ground plate 86 and out the ground pin 81 to the source of ground potential. In the event of a sustained voltage surge, sufficient heat is transferred from the center electrode 101 to the eyelet to cause heat to be transferred through the flange 66 to melt the alloy which supports the eyelet along the line pin 61. At that time, as before with excess current occurrence, the eyelet 62 is caused to be moved along the pin 61 under the urging of the spring 43 to cause the flange 67 of the eyelet to engage the ground plate 86 and establish a shortened fault current path.

It should be understood that while the preferred embodiment of this invention includes two identical protector assemblies disposed within a single housing, the invention is not so limited. For example, and depending on the use to which the assembly is put, it could include a grounding subassembly, a heat coil subassembly and a voltage surge limiter subassembly disposed on one side of the grounding subassembly. The other side of the housing may support a dummy heat coil subassembly. Further, the heat coil and/or voltage protection characteristics on one side of the module 30 need not be identical to those on the other side. The voltage protection can be changed by changing the gap 99 and the current protection can be changed by providing more or less resistance in the wound wire 69.

Another feature of the protector of this invention relates to the grounding of excessive currents and voltages. It always has been desired to have the flange which extends from the sleeve 62 extend on one side of the line pin to facilitate engagement with the ground plate 86. When the entire length of the line pin had a circular cross-section, this orientation of the sleeve on the pin could not be insured. In the protector of this invention, the square cross-section of the sleeve-engaging portion of the line pin insures that the sleeve can be oriented in an automatic assembly apparatus (not shown) to cause the extended flange to be oriented toward the longitudinal centerline of the protector.

It is to be understood that the above-described arrangements are simply illustrative of the invention. Other arrangements may be devised by those skilled in the art which will embody the principles of the invention and fall within the spirit and scope thereof.

What is claimed is:

1. An electrical protector assembly for protecting a circuit against excessive current increases an voltage surges, said protector assembly comprising:

a dielectric housing supporting the assembly;

a grounding subassembly for grounding said protector assembly when excessive voltage surges and excessive current increases occur in a circuit;

a voltage protection subassembly connected electrically to said grounding subassembly;

a current protection subassembly including a dielectric base for supporting first and second electrically conductive elements and a shunting element which are connected together to establish electrical contact between a circuit and said protector assembly, said shunting element being movably mounted and supported in a predetermined position along said first element in axial alignment therewith by a spacing member which comprises a fusible material, said fusible material being interposed between an end portion of said first element and a portion of said shunting element without being secured to said shunting element by a fused portion of said spacing member; and means interposed between said voltage protection subassembly and said housing and removed from a current path between said voltage protection and grounding subassemblies for maintaining said voltage protection subassembly in electrical engagement with said shunting element, and which is effective upon melting of the spacing member caused by the flow of current above a predetermined level for causing said shunting element to be moved along said first element to engage said grounding subassembly and provide a current path from said first element to said grounding subassembly.

2. The protector assembly of claim 1, wherein at least said end portion of said first conductive element is tubular with said spacing member being supported in engagement with an end surface of said end portion.

3. The protector assembly of claim 2, wherein a cross-section of a portion of said tubular member which is transverse of a longitudinal axis of said tubular member has a square configuration.

4. The protector assembly of claim 2, wherein said spacing member of fusible material is supported in engagement with the end surface of said end portion of said first conductive element and an end flange of said shunting element, said voltage protection subassembly being in engagement with said end flange of said shunting element.

5. The protector assembly of claim 1, wherein said means is removed from a circuit between said first and second electrically conductive elements and from the current path from said first element to said grounding subassembly.

6. The protector assembly of claim 1, wherein an axis through said shunting element and said first conductive element is offset from an axis of said voltage protection subassembly.

7. An electrical protector assembly for protecting a circuit from excessive current increases and excessive voltage surges, said protector assembly comprising:

a dielectric housing for supporting said assembly;

a current protection subassembly which comprises a dielectric base adapted to be secured to said housing, first and second electrically conductive pins supported in said base and extending therethrough, said first pin having a tubular end portion, a sleeve which has electrically conductive flanged end portions and which is disposed concentrically about said tubular end portion of said first pin and supported in an initial position by a pellet of fusible material that extends between an end portion of said sleeve and an end surface of said first pin without said pellet being secured to said sleeve by a fused portion of said pellet, and a wire having predetermined resistance characteristics which is wound about an outer surface of said sleeve with one end being connected electrically to an end portion of said sleeve and with its other end being secured to said second pin to establish a current path from said first pin through said sleeve and said wire to said second pin;

a voltage protection subassembly which includes first and second electrodes with said first electrode engaging one flanged end of said sleeve and with said electrodes supported within said housing in a manner to provide a predetermined gap therebetween;

a grounding subassembly which is connected electrically to said second electrode to provide a current path from said first pin through said first electrode across said gap to said second electrode and to ground during a voltage surge which is sufficient to cause the current to bridge said gap;

resilient means disposed between said voltage protection subassembly and said housing for maintaining said first electrode in engagement with said one flanged end of said sleeve and which is rendered effective upon the melting of the pellet of fusible material caused by the flow of excessive current for causing said sleeve to be moved along said first pin to a second position where another flanged end of said sleeve engages said grounding subassembly to provide a fault current path from said first pin to said grounding subassembly.

8. The protector assembly of claim 7, wherein said resilient means is removed from the current path from said first pin to said second pin and from said fault current path.

9. The protector assembly of claim 7, wherein said pellet is supported in engagement with an end surface of said tubular end portion of said first conductive pin and with one of the flanged end portions of said sleeve, and wherein the fusible material is melted by heat transfer from said voltage protection subassembly into said sleeve as a result of a sustained voltage surge.

10. The protector assembly of claim 9, wherein said current protection subassembly includes current responsive, heat sensitive means which includes said sleeve and said wire and which is offset from an axis which extends through said electrodes of said voltage protection subassembly.

11. The protector assembly of claim 9, wherein said tubular end portion of said first pin and said sleeve each have a transverse cross-section which is normal to a longitudinal axis of said pin and which is rectangular.

12. The protector assembly of claim 11, wherein said tubular end portion of said first pin which is rectangular transitions into a circular cross-section at another portion thereof.

13. The protector assembly of claim 11, wherein said sleeve has one end oriented toward said voltage protection subassembly and another end oriented toward said dielectric base and wherein said tubular end of said first pin which is rectangular is disposed within said sleeve and held a predetermined distance from said one end of said sleeve by said pellet of fusible material which is disposed between said one end of said sleeve and that end of said first pin which is disposed in said sleeve.

14. The protector assembly of claim 7, wherein said first pin of said current protection subassembly includes a portion for establishing direct engagement with a circuit to be protected, said pin extending through said base; and a barb formed on said pin and encapsulated by said base for resisting longitudinal forces applied to said pin when said assembly is connected to the circuit.

15. The protector assembly of claim 7, wherein said voltage protection subassembly includes center and base carbon electrodes, insulative means for holding said center electrode such that it is axially aligned with said base electrode and spaced therefrom with said electrodes being spaced apart axially a predetermined distance to form a spark-gap, said center electrode engaging a flange of said sleeve to which sad one end of said wire is electrically connected and wherein said grounding subassembly includes conductive means for supporting said carbon electrodes within said housing, said conductive means being in electrical engagement with said base electrode and with said grounding subassembly.

16. The electrical protector assembly of claim 7, wherein said first pin has an end disposed within said sleeve and said sleeve is an eyelet having a transverse cross section which is square and comprising a hub portion about which convolutions of said wire are wound and a conductive flange at each end thereof, said eyelet being closed at one end thereof which is adjacent to said voltage protection subassembly and said pellet of fusible material extending between the closed end of said sleeve and the edge surface of the end portion of said first pin which is disposed within said sleeve, said convolutions of said wire being wrapped about said sleeve between a transverse centerline of said sleeve and said closed end of said sleeve.

17. The electrical protector assembly of claim 7, wherein said resilient means includes a compression spring and the circuit to be protected includes a tip conductor and a ring conductor with one said current protection subassembly, one said voltage protection subassembly, one said compression spring and a portion of said grounding subassembly being associated with each of the tip and the ring conductors, said first pin of each said current protection subassembly being a line pin and said second pin being a central office pin, and wherein said current protection subassembly, said voltage protection subassembly, and said compression spring associated with each of the tip and ring conductors of the circuit and said grounding subassembly are mounted in said housing, said electrodes of each said voltage protection subassembly being spaced apart and positioned along a common axis, each common axis being spaced from a centerline axis of said protector assembly, and each common axis being offset from and axis which extends through said first pin and said sleeve.

18. The electrical protector assembly of claim 17, wherein said voltage protection subassembly includes a gaseous discharge device which is associated with each of the tip and ring conductors.

19. An electrical protector assembly for protecting a circuit against excessive voltages and excessive currents, said assembly including:

a dielectric housing;

grounding means disposed within said housing for providing a current path to ground when excessive voltage surges and excessive currents appear in a circuit;

a current protection subassembly which includes:

a dielectric base; and a current responsive means for sensing excessive currents, said current responsive means including a first metallic contact element for establishing electrical contact beween a circuit and said protector assembly and a metallic sleeve which is disposed concentrically about and held adjacent to one end of said first contact element by a pellet of a fusible material which is interposed between an end of said first metallic contact element and a closed end of said sleeve, said sleeve having a conductive flange at each end thereof and windings of an insulated wire having a predetermined resistance wound about an outer surface thereof, said first contact element extending through said base and said wire having an end portion which extends to and is bonded to said sleeve adjacent to one end of said first contact element, said sleeve being adapted to establish a fault current path with said grounding means when the current increases beyond a predetermined level;

a surge voltage protection subassembly engaging said grounding means and including means being in engagement with one of said flanges of said sleeve of said current responsive means such that an axis through said first metallic contact element of said current responsive means is offset from an axis of said surge voltage protection subassembly;

a second metallic contact element which extends through said base, and which is connected electrically to said current responsive means through said wire which has its other end bonded to said second contact element, said second contact element and said first contact element adapted to conduct normal circuit current with the application of normal circuit voltage; and spring means disposed between said voltage protection subassembly and said housing and removed from the normal current and the fault current paths for biasing said surge voltage protection subassembly into engagement with said one of said flanges of said sleeve of said current responsive means and being effective upon the occurrence of excess heat, which is generated by current above the predetermined level and which is sufficient to melt the pellet of fusible material, to move said sleeve to cause the other flange to engage said grounding means and establish the fault current path.

20. An electrical protector assembly for protecting a tip conductor and a ring conductor of a circuit against excessive voltage surges and excessive current increases, said assembly comprising;

a dielectric housing;

a dielectric base which is snap-locked to said housing;

grounding means secured to said base for grounding said protector assembly when excessive voltage surges and excessive currents appear in the circuit to be protected;

a voltage protection subassembly which is associated with each conductor and which is mounted in said housing, said voltage protection subassembly including:

a first carbon electrode;

a second carbon electrode adapted to be connected electrically to the circuit to be protected, aligned with said first electrode, spaced a predetermined distance therefrom and cooperating with one end thereof to form a gap across which excess voltage surges may be dissipated to said grounding means; and electrically conductive supporting means for holding said first and second carbon electrodes in aligned, spaced relationship within said housing, said supporting means being connected electrically to said first carbon electrode and to said grounding means;

a current protection subassembly which is associated with each conductor and which is mounted in said housing, each said current protection subassembly comprising:

a first conductive tubular pin which extends through said base and which is adapted to connect the circuit to be protected to said current protection subassembly, said first pin being a line pin;

a second conductive pin which extends through said base and which is adapted to cooperate with the line pin to conduct normal circuit current;

a movable conductive sleeve which is held along the line in a first position and being connected electrically thereto, said movable conductive sleeve having one end in electrical engagement with said second carbon electrode;

heat generating means compising a plurality of convolutions of wire having predetermined electrical characteristics having one end thereof connected electrically through said movable conductive sleeve to the line pin and the other end thereof connected to said second pin; and heat responsive fusible spacer means interposed between an edge surface of an end of the line pin and said one end of said sleeve which is in engagement with said second electrode without said spacer means being secured to said sleeve by a fusible portion of said spacer means for holding said movable sleeve-adjacent to one end of the line pin in a first position and rendered effective by the occurrence of excessive current above a predetermined level for permitting said movable sleeve to be moved along the line pin to establish an electrical connection with said grounding means; and resilient means interposed between each of said voltage protection subassemblies and said housing for maintaining said second electrode in electrical engagement with said sleeve and for moving said sleeve to a second position along the line pin into engaement with said grounding means when the heat responsive means is rendered effective by an excessive amount of heat produced by said heat generating means in the presence of current flow above the predetermined level.

21. The assembly of claim 20, wherein said grounding means includes:

a ground plate which is disposed between inner ends of said first and second conductive pins, which is disposed adjacent to said base, and which is adapted to be engaged by one end of said sleeve when said sleeve is moved to its second position;

a pin having an end secured to said ground plate and extending through said base; and a bifurcated portion connected to said ground plate and extending laterally thereof, said portion having furcations each of which includes a free end that engages one of said conductive means which supports the electrodes of one of said voltage protection subassemblies.

* * * * *